(12) United States Patent
Bandy

(10) Patent No.: US 10,947,939 B1
(45) Date of Patent: Mar. 16, 2021

(54) RESONATOR UNDER INTAKE MANIFOLD

(71) Applicant: Cummins Inc., Columbus, IN (US)

(72) Inventor: Bryan C. Bandy, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/713,209

(22) Filed: Dec. 13, 2019

(51) Int. Cl.
*F02M 35/12* (2006.01)
*F02M 35/10* (2006.01)
*F02M 35/00* (2006.01)

(52) U.S. Cl.
CPC ........ *F02M 35/1255* (2013.01); *F02M 35/00* (2013.01); *F02M 35/10* (2013.01); *F02M 35/10026* (2013.01); *F02M 35/10052* (2013.01); *F02M 35/10118* (2013.01); *F02M 35/10124* (2013.01); *F02M 35/12* (2013.01); *F02M 35/1211* (2013.01); *F02M 35/1216* (2013.01); *F02M 35/1233* (2013.01); *F02M 35/1261* (2013.01); *F02M 35/1266* (2013.01); *F02M 35/1272* (2013.01); *F02M 35/1294* (2013.01)

(58) Field of Classification Search
CPC ............... F02M 35/1255; F02M 35/12; F02M 35/1211; F02M 35/1216; F02M 35/1233; F02M 35/1294; F02M 35/00; F02M 35/10052; F02M 35/10124; F02M 35/10026; F02M 35/1261; F02M 35/1266; F02M 35/10118; F02M 35/10; F02M 25/1272
See application file for complete search history.

(56) References Cited

U.S. PATENT DOCUMENTS

| 7,198,017 | B2 | 4/2007 | Vogt et al. |
| 7,246,593 | B2 | 7/2007 | Murphy |
| 7,350,496 | B2 | 4/2008 | Nakayama et al. |
| 7,562,646 | B2 | 7/2009 | Seko et al. |
| 9,951,728 | B2 * | 4/2018 | Ostler ...................... F01N 1/24 |
| 2008/0173271 | A1 * | 7/2008 | Prior .................. F02M 35/1261 123/184.57 |
| 2010/0071676 | A1 * | 3/2010 | Arvan .............. F02M 35/10157 123/573 |

OTHER PUBLICATIONS

Jensen Samuel, Effect of Variable Length Intake Manifold on a Turbocharged Multi-Cylinder Diesel Engine, Nov. 27, 2013, Combat Vehicles R & D Estt, DRDO, India (Year: 2013).*

* cited by examiner

*Primary Examiner* — Syed O Hasan
(74) *Attorney, Agent, or Firm* — Foley & Lardner LLP

(57) ABSTRACT

A system for reducing noise associated with a compressor of an engine system comprises an intake manifold and a resonator comprising an outlet. The resonator is coupled to, and is positioned adjacent to, the intake manifold. An outlet pipe is in fluid communication with the outlet and the compressor, and a length of the outlet pipe extends from the outlet to the compressor. Positioning the resonator adjacent to the intake manifold reduces the length of the outlet pipe so as to reduce noise associated with air flowing through the outlet pipe.

14 Claims, 3 Drawing Sheets

US 10,947,939 B1

RESONATOR UNDER INTAKE MANIFOLD

TECHNICAL FIELD

The present invention relates generally to systems for coupling a resonator to an engine system.

BACKGROUND

In an internal combustion engine, clean air is provided to engine driven air compressors so that the air can be pressurized to feed the chassis brake system or other systems where pressurized air is needed. The rapid intake of the air into the air compressor, along with the pulsating nature of the air compressor piston pumping, results in an audible noise.

SUMMARY

In one set of embodiments, an apparatus for noise reduction in an engine system comprises an intake manifold. A first extension extends from a bottom surface of the intake manifold. A resonator comprises an inlet and an outlet, and the resonator is coupled to the first extension. An outlet pipe is in fluid communication with the outlet and the compressor, a length of the outlet pipe extending from the outlet to the compressor, and an inlet pipe is in fluid communication with the inlet and a clean air source. Coupling the resonator to the first extension causes the bottom surface to contact the resonator.

In another set of embodiments, a system for reducing noise associated with a compressor of an engine system, comprises an intake manifold comprising a body and a plurality of extensions extending from the body. A resonator comprises a top surface, and the top surface defines a plurality of recesses. An outlet pipe is in fluid communication with the resonator and the compressor, and a length of the outlet pipe extends from the resonator to the compressor. The resonator is positioned adjacent to the intake manifold and the resonator is in close proximity to the compressor.

In yet another set of embodiments, an engine system comprises a compressor, a resonator, and an outlet pipe. The outlet pipe is coupled to the resonator and the compressor, the outlet pipe providing for air flow from the resonator to the compressor, the outlet pipe comprising an outlet pipe length. An intake manifold is coupled to, and positioned adjacent to, the resonator. The position of the resonator relative to the intake manifold reduces the outlet pipe length so as to reduce a noise associated with the air flow from the resonator to the compressor.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Following below are more detailed descriptions of various concepts related to, and implementations of, methods, apparatuses, and systems for coupling a resonator to an intake manifold of an engine. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Implementations herein relate to systems for mounting a resonator under an intake manifold of an internal combustion engine so as to decrease the distance between the resonator and a compressor. In some embodiments, the intake manifold includes a plurality of extensions configured to interface with the resonator such that the resonator can be coupled to the intake manifold. Positioning the resonator in the manner described serves to reduce the length of an outlet pipe extending between the resonator and a compressor. Reducing the length of the outlet pipe reduces the noise associated with cycling the compressor on and off during engine operation.

II. Conventional Resonator Position

Figure 1:
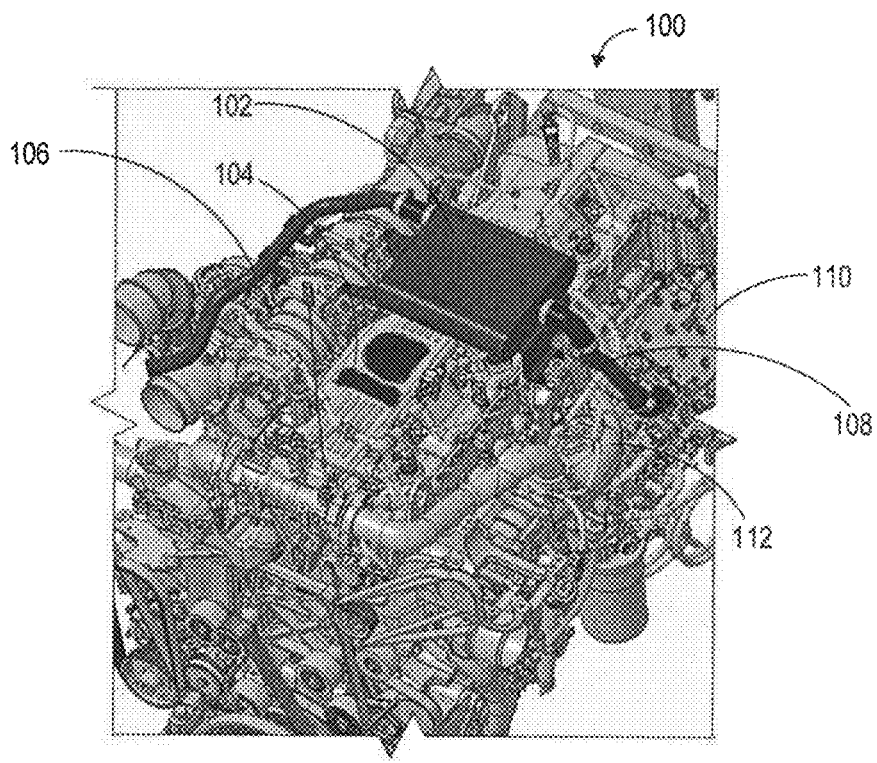
FIG. 1 is an illustration of an engine system with conventional placement of a resonator.

FIG. 1 is an illustration of an engine system 100 with conventional placement of a resonator 102. The engine system 100 includes a top surface 104 on which the resonator 102 is mounted via mounting brackets. The resonator 102 is configured to receive air from an inlet pipe 106 and provide air to an outlet pipe 108. The resonator 102 includes a substantially hollow volume positioned between the inlet pipe 106 and the outlet pipe 108 that is configured to reduce the noise created by air being drawn through the resonator 102. The outlet pipe 108 is coupled to the resonator and a compressor 110. The compressor 110 is configured to compress air from the resonator 102 and supply the compressed air to an intake manifold 112:

During engine operation, the compressor 110 alternates between "on" and "off" states. For example, when air driven components on the vehicle demand air, the compressor 110 will cycle on to supply pressurized air to these systems. As the compressor 110 alternates between states, the air flow through the inlet pipe 106, the resonator 102, and the outlet pipe 108 starts and stops. When the air flow stops suddenly as the compressor 110 moves to the "off" state, the air creates a shock wave in the outlet pipe 108 and back through the resonator 102 and the inlet pipe 106, which creates noise. This phenomenon is similar to the "water hammer" phenomenon as high pressure water flow in pipes is started and stopped suddenly.

The length of the outlet pipe 108 plays a significant role in the noise level associated with the shock wave. A longer pipe provides a longer distance over which the shock wave travels to dissipate, thereby allowing the noise level to persist for a longer period as compared to a shorter pipe. With the resonator 102 positioned on the top surface 104, the outlet pipe 108 is relatively long (e.g., approximately 63 centimeters (cm)), the system is not effective in reducing noise (e.g., approximately 85 decibels (dB) at an intake plenum and approximately 62 dB in a vehicle cab) as compared to embodiments disclosed herein. Furthermore, a system without the resonator 102 exhibits significantly more noise that a system with a resonator, as no additional elements are in the path of the shock wave to dissipate the energy.

In addition, the total volume of the resonator 102 determines how quickly energy from the shock wave is dissipated. For example, a resonator that encloses a large volume (e.g., greater than three liters) is much more effective at reducing noise associated with a shock wave than a resonator that encloses a small volume (e.g., less than three liters).

III. Example Resonator and Intake Manifold Positioning

Figure 2:
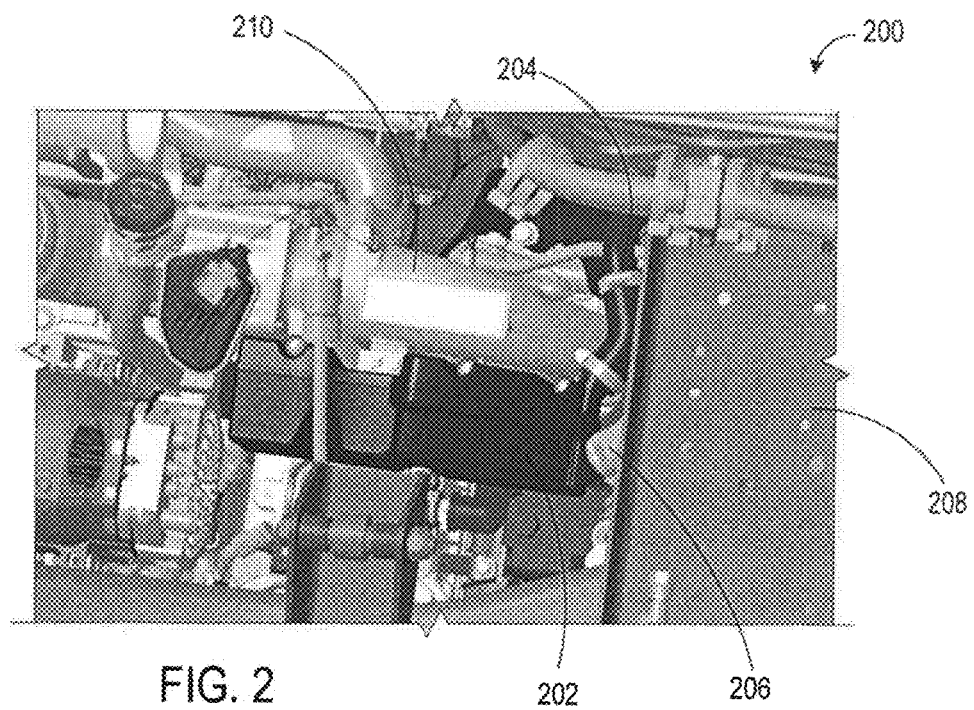
FIG. 2 is an illustration of a portion of an engine system with a resonator coupled to an intake manifold, according to a particular embodiment.

FIG. 2 is an illustration of a portion of an engine system with a resonator 202 coupled to an intake manifold 210, according to a particular embodiment. The resonator 202 is configured to receive air from an inlet pipe 204 and provide air to an outlet pipe 206. The inlet pipe 204 receives air from a clean air source (e.g., the ambient environment). The resonator 202 includes a substantially hollow volume positioned between the inlet pipe 204 and the outlet pipe 206 that is configured to reduce the noise of air being drawn through the resonator 102. The outlet pipe 206 is positioned between the resonator 202 and a compressor 208. In some embodiments, the resonator 202 is manufactured from a lightweight material (e.g., plastic) that is shaped to fit between various engine components.

The resonator 202 is positioned directly below the intake manifold 210 and is coupled to the intake manifold 210 with fasteners. To couple the resonator 202 to the intake manifold 210, the shape of the intake manifold 210 is modified to include various extensions to interface with the resonator 202. The shape of the intake manifold 210 is further described with reference to FIGS. 5A-B.

Figure 3:
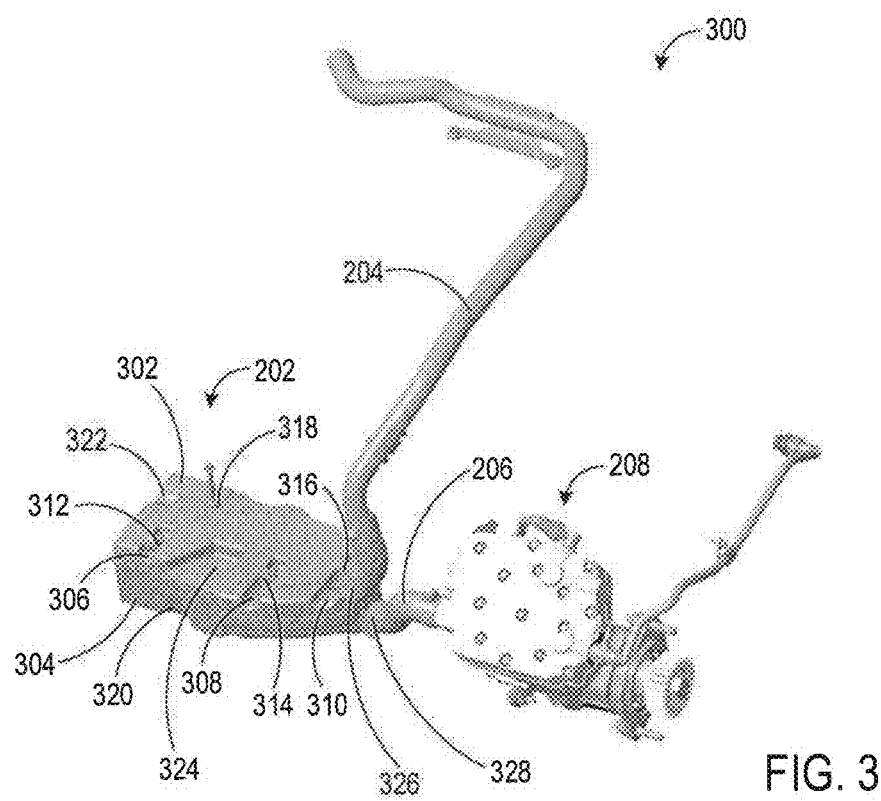
FIG. 3 is an illustration of a resonator system including the resonator of FIG. 2, according to a particular embodiment.

FIG. 3 is an illustration of a resonator system 300 including the resonator 202 of FIG. 2, according to a particular embodiment. The resonator system 300 includes the compressor 208, where the resonator 202 is coupled to the compressor 208 via the outlet pipe 206. The resonator 202 includes a top surface 302, a front surface 304, a back surface (not shown) opposite the front surface 304, a side surface (not shown), and a bottom surface (not shown) opposite the top surface 302. The front surface 304 extends from the side surface in a curvilinear fashion and meets the back surface at an outlet 328. The back surface extends from the side surface in a curvilinear fashion and meets the front surface 304 at the outlet 328. The outlet 328 is the portion of the resonator 202 coupled to the outlet pipe 206.

The top surface 302 defines a first recess 306, a second recess 308, and a third recess 310 (collectively referred to herein as "recesses 306-310"). The recesses 306-310 extend toward the bottom surface and provide spaces in which additional components are positioned. For example, the first recess 306 includes a first attachment structure 312 positioned within the first recess 306, the second recess 308 includes a second attachment structure 314 positioned within the second recess 308, and the third recess 310 includes a third attachment structure 316 positioned within the third recess 310. The first attachment structure 312, the second attachment structure 314, and the third attachment structure 316 are collectively referred to herein as "attachment structures 312-316." The attachment structures discussed herein can include, for example, threaded nuts, unthreaded nuts, washers, or any other type of structure to which a fastener can be secured. The attachment structures 312-316 are configured to receive fasteners and are positioned within the recesses 306-310 so as to divide the recesses 306-310 into separate portions. A front portion of the recesses 306-310 is defined by the attachment structures 312-316 and the front surface 304, where the front portion of the recesses 306-310 extends through the front surface 304 so as to provide access to the attachment structures 312-316 from the front surface 304. A back portion of the recesses 306-316 is defined by the attachment structures 312-316 and the end of the recesses 306-310 so as to provide pockets to receive additional components.

The attachment structures 312-316 can be integrally formed with the resonator 202 or can be coupled to the resonator 202 via mechanical methods (e.g., via fasteners or adhesives). In some embodiments, the attachment structures 312-316 each possess a substantially circular cross-sectional shape. In some embodiments, the attachment structures 312-316 possess other cross-sectional shapes (e.g., hexagonal, square, rectangular, oval, etc.). Generally, the cross-sectional shape of the attachment structures 312-316 defines the shape of the recesses 306-310.

For example, if the cross-sectional shape of the attachment structures 312-316 is substantially circular, the cross-sectional shape of the recesses 306-310 is generally semi-circular. However, in some embodiments the cross-sectional shape of the attachment structures 312-316 does not define the shape of the recesses 306-310, and the shape of the recesses 306-310 can be different than the cross-sectional shape of the attachment structures 312-316.

A fourth attachment structure 318 is positioned on the top surface 302 and is configured to receive a fastener. In some embodiments, the fourth attachment structure 318 is integrally formed with the top surface 302. In some embodiments, the fourth attachment structure 318 is coupled to the top surface 302 via mechanical methods (e.g., via fasteners or adhesives). In an example arrangement, the fourth attachment structure 318 extends beyond a plane defined by the top surface 302; however, in other arrangements the fourth attachment structure 318 does not extend beyond the plane defined by the top surface 302. The fourth attachment structure 318 includes a cross-sectional shape similar to those of the attachment structures 312-316.

To allow the resonator 202 to be coupled to the intake manifold 210 such that the top surface 302 is adjacent to a bottom surface of the intake manifold 210 (e.g., the distance between the top surface 302 and the bottom surface of the intake manifold 210 is between zero and two centimeters), in some embodiments, the attachment structures 312-316 and the fourth attachment structure 318 do not extend above the top surface 302 (e.g., the attachment structures 312-316 and the fourth attachment structure 318 do not extend beyond the plane defined by the top surface 302). In some arrangements, the attachment structures 312-316 and the fourth attachment structure 318 extend above the plane defined by the top surface while allowing the intake manifold 210 to remain adjacent to the resonator 202.

The front surface 304 and the bottom surface define a notch 320. The notch 320 is sized to prevent the resonator 202 from interfering with additional components positioned around the resonator 202. The notch 320 includes a generally parabolic cross-sectional shape extending from the intersection of the front surface 304 and the bottom surface toward the top surface 302 such that the notch 320 is wider at the bottom surface than it is as it extends toward the top surface 302.

The top surface 302 and the side surface define a fourth recess 322. The fourth recess 322 is sized to receive a portion of the intake manifold 210 so as to allow the intake manifold 210 to be adjacent to the resonator 202. The fourth recess 322 is shaped similarly to the recesses 306-310 (e.g., it includes a substantially semi-circular cross-section to receive the intake manifold 210).

The top surface 302 and the front surface 304 define a fifth recess 324. The fifth recess 324 is sized to receive a portion of the intake manifold 210 so as to allow the intake manifold 210 to be adjacent to the resonator 202. The fifth recess 324 is shaped such that the fifth recess 324 is wider at the front surface 304 than it is as the fifth recess 324 extends from the front surface 304 to an end of the fifth recess 324, where the end of the fifth recess 324 is positioned between the front surface 304 and the back surface.

An inlet 326 is coupled to the inlet pipe 204 and provides a conduit through which air flows from the inlet pipe 204 into the resonator 202. Air within the resonator 202 is drawn from the resonator 202 and into the outlet pipe 206 through the outlet 328 so as to direct air to the compressor 208.

Figure 4:
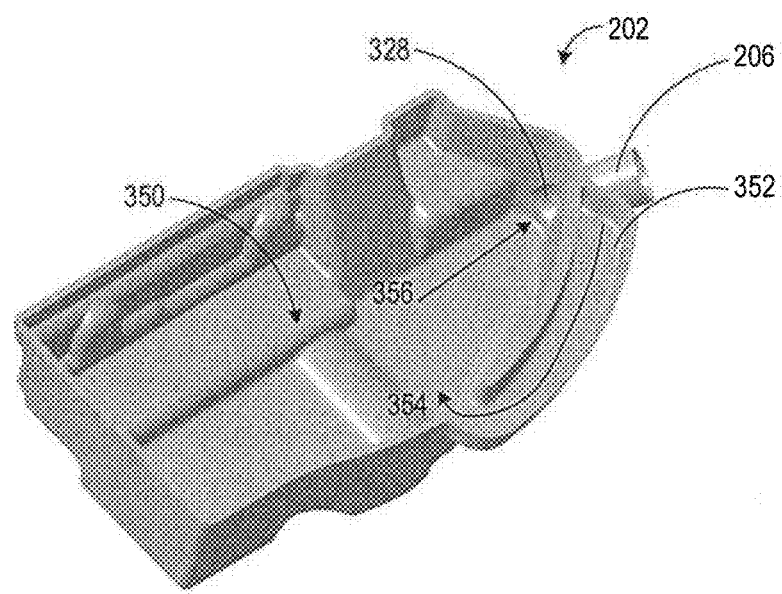
FIG. 4 is an illustration of a cross section of the resonator of FIG. 2.

FIG. 4 is an illustration of a cross section of the resonator 202 of FIG. 2. The resonator 202 includes an inlet path 352. The inlet path 352 is fluidly coupled to the inlet 326 and is configured to direct air into a hollow volume 350. The hollow volume 350 is fluidly coupled to the inlet path 352 and the outlet 328 and is configured to provide a space to allow air to reflect off the walls of the hollow volume 350, thereby reducing resonant sound waves and reducing noise associated with air flow from the inlet path 352. The inlet 326 is positioned above the outlet 328 such that air flow is directed along the inlet path 352 and into the hollow volume 350 as indicated by the arrow 354. As the air is pulled from the resonator 202 by the compressor 208, the air is directed to the outlet 328 as indicated by the arrow 356.

Returning to FIG. 3, when the compressor is pulling air from the resonator 202, air flows from the outlet 328 and into the outlet pipe 206, and then into the compressor 208. As the engine 200 operates, the compressor 208 will intermittently turn on and off (e.g., the compressor 208 pulls air from the resonator 202 when it is on, and does not pull air from the resonator 202 when it is off) such that the flow of air into the compressor starts and stops. As compared to the outlet pipe 108 from FIG. 1, the outlet pipe 206 is substantially shorter than the outlet pipe 108 (e.g., the length of the outlet pipe 206 is approximately fourteen centimeters, plus or minus four centimeters). Accordingly, when the flow of air is abruptly stopped and started again when the compressor 208 is pumping, the air flowing in the outlet pipe 206 creates a noise when the air hits a closed valve of the compressor 208 and reflects back toward the resonator 202. The hollow volume 350 of the resonator 202 dissipates the energy (e.g., the noise) associated with the air in the inlet pipe 204. Because the outlet pipe 206 is substantially shorter than the outlet pipe 108 (e.g., an outlet pipe of conventional length), the noise from the air bouncing back and forth within the outlet pipe 206 dissipates faster than if the air were in the outlet pipe 108. Accordingly, positioning the resonator 202 such that the outlet 328 is in close proximity to the compressor 208 is advantageous to reduce noise. As used herein, "close proximity" refers to components being with twenty centimeters.

Figure 5A:
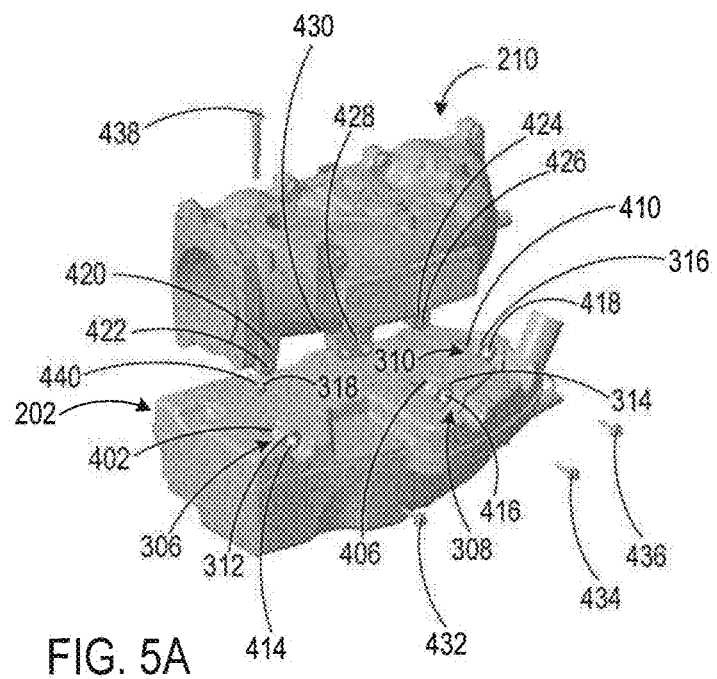
FIGS. 5A-B are illustrations of coupling the resonator to the intake manifold, both of FIG. 2, according to a particular embodiment.
Figure 5B:
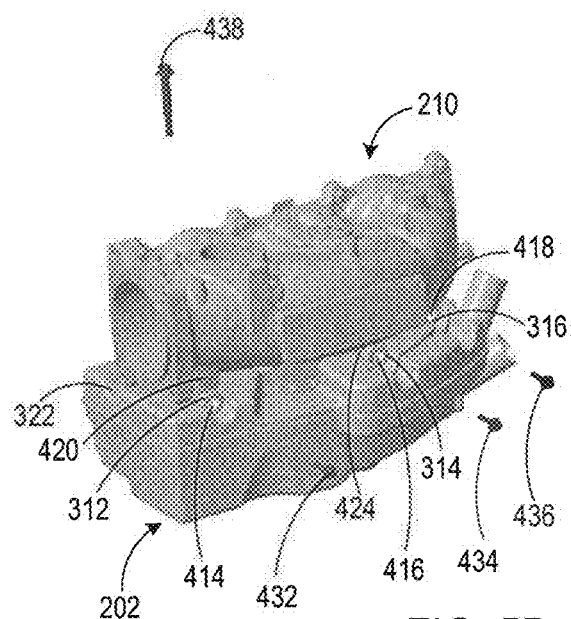

FIGS. 5A-B are illustrations of coupling the resonator 202 to the intake manifold 210, both of FIG. 2, according to a particular embodiment. The resonator 202 further includes a first pocket 402 defined by the first attachment structure 312 and the first recess 306. A second pocket 406 is defined by the second attachment structure 314 and the second recess 308. A third pocket 410 is defined by the third attachment structure 316 and the third recess 310. The first attachment structure 312 defines a first aperture 414 extending therethrough. The first aperture 414 is generally circular in cross section and is configured to receive a first fastener 432. The first fastener 432 can be any type of fastener typically used to couple structures. In an example embodiment, the first fastener 432 includes a threaded bolt portion and a head portion coupled to the threaded bolt portion. In some embodiments, the first aperture 414 is sized such that a diameter of the first aperture 414 is larger than a diameter of the threaded bolt portion of the first fastener 432 so as to allow the threaded bolt portion of the first fastener 432 to pass through the first aperture 414 without resistance. The head portion is sized such that a dimension of the head portion of the first fastener 432 is larger than the diameter of the first aperture 414 so as to prevent the head portion of the first fastener 432 from passing through the first aperture 414. In some embodiments, the first aperture 414 is configured to interface with the threaded bolt portion of the first fastener 432 (e.g., the first aperture 414 includes threads that interface with the threaded bolt portion of the first fastener 432).

The second attachment structure 314 defines a second aperture 416 extending therethrough, and the second aperture 416 is configured to receive a second fastener 434. The third attachment structure 316 defines a third aperture 418 extending therethrough, and the third aperture 418 is configured to receive a third fastener 436. The second aperture 416 and the third aperture 418 are substantially similar in size, shape, and description to the first aperture 414. The second fastener 434 and the third fastener 436 are substantially similar in size, shape, and description to the first fastener 432.

The fourth attachment structure 318 defines a fourth aperture 440 configured to receive a fourth fastener 438. The fourth fastener is substantially similar in size, shape, and description to the first fastener 432. The fourth aperture is configured to interface with the threaded bolt portion of the fourth fastener 438 (e.g., the fourth aperture 440 includes threads that interface with the threaded bolt portion of the fourth fastener 438).

The intake manifold 210 includes a bottom surface 430 configured to be adjacent to the top surface 302 of the resonator 202. In some embodiments, the bottom surface 430 of the intake manifold 210 is configured to contact the top surface 302 of the resonator 202. A first extension 420 extends from the bottom surface 430 and is sized to fit within the first pocket 402. The first extension 420 defines a first opening 422 extending therethrough. When the first pocket 402 receives the first extension 420, the first opening 422 is aligned with the first aperture 414 such that a longitudinal axis extending through a center of the first aperture 414 is substantially coaxial (e.g., within plus or minus one millimeter) with a longitudinal axis extending through a center of the first opening 422. The first opening 422 is configured to interface with the threaded bolt portion of the first fastener 432 (e.g., the first opening 422 includes threads that interface with the threaded bolt portion of the first fastener 432) so as to secure the first attachment structure 312 to the first extension 420. In some embodiments, a washer is positioned between the head portion of the first fastener 432 and the first attachment structure 312.

A second extension 424 extends from the bottom surface 430 and is sized to fit within the second pocket 406. The second extension 424 defines a second opening 426 extending therethrough configured to receive the second fastener 434. The second opening 426 is configured to be substantially coaxial with the second aperture 416 when the second extension 424 is received in the second pocket 406 in the same manner as described with reference to the first aperture 414 and the first opening 422.

A third extension (not shown) extends from the bottom surface 430 and is sized to fit within the third pocket 410. The third extension defines a third opening (not shown) extending therethrough configured to receive the third fastener 436. The third opening is configured to be substantially coaxial with the third aperture 418 when the third extension is received in the third pocket 410 in the same manner as described with reference to the first aperture 414 and the first opening 422.

A fourth extension (not shown) extends from a back surface (not shown) of the intake manifold 210. The fourth extension defines a fourth opening sized and configured to receive the fourth fastener 438. In some embodiments, the fourth opening is sized such that a diameter of the fourth opening is larger than a diameter of the threaded bolt portion of the fourth fastener 438 so as to allow the threaded bolt portion of the fourth fastener 438 to pass through the fourth opening without resistance. The head portion is sized such that a dimension of the head portion of the fourth fastener 438 is larger than the diameter of the fourth opening so as to prevent the head portion of the fourth fastener 438 from passing through the fourth opening. In some embodiments, the fourth opening is configured to interface with the threaded bolt portion of the fourth fastener 438 (e.g., the fourth opening includes threads that interface with the threaded bolt portion of the fourth fastener 438).

A fifth extension 428 extends from the bottom surface 430 and is sized to fit within the fifth recess 324. In some embodiments, the fifth extension 428 includes one or more openings extending therethrough such that additional components can be coupled to the intake manifold 210.

To couple the intake manifold 210 and the resonator 202, the first fastener 432 is inserted through the first aperture 414 and the first opening 422 to secure the first attachment structure 312 to the first extension 420. The second fastener 434 is inserted through the second aperture 416 and the second opening 426 to secure the second attachment structure 314 to the second extension 424. The third fastener 436 is inserted through the third aperture 418 and the third opening to secure the third attachment structure 316 to the third extension. The fourth fastener 438 is inserted through the fourth opening and the fourth aperture 440 to secure the fourth attachment structure 318 to the fourth extension.

Assembled as described, the resonator 202 is positioned under the intake manifold 210. In some embodiments, the top surface 302 of the resonator 202 contacts the bottom surface 430 of the intake manifold. In some embodiments, the top surface is positioned adjacent to the bottom surface 430. Positioning the resonator 202 relative to the intake manifold 210 as described allows the resonator to be in close proximity to the compressor, so as to decrease the length of the outlet pipe 206 and reduce noise associated with intermittently operating the compressor 208.

Various experiments were performed to determine the benefit of decreasing the length of the outlet pipe. When comparing the noise associated with the outlet pipe 108 and the outlet pipe 206, measurements taken at the intake plenum show that the outlet pipe 206 decreases noise by approximately two decibels (dB) when compared to the outlet pipe 108. Measurements taken in a cab of a vehicle show that the outlet pipe 206 decreases noise by approximately 0.5 dB when compared to the outlet pipe 108.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language a "portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Although only a few embodiments have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or resequenced according to alternative embodiments. Other substitutions, modifications, changes, and omissions may also be made in the design, operating conditions and arrangement of the various exemplary embodiments without departing from the scope of the present invention.

What is claimed is:

1. An apparatus for noise reduction in an engine system including a compressor, comprising:
    an intake manifold;
    a first extension extending from a bottom surface of the intake manifold;
    a resonator comprising an inlet and an outlet, the resonator coupled to the first extension;
    an outlet pipe in fluid communication with the outlet and the compressor, a length of the outlet pipe extending from the outlet to the compressor; and
    an inlet pipe in fluid communication with the inlet and a clean air source;
    wherein coupling the resonator to the first extension causes the bottom surface to contact the resonator, wherein coupling the resonator to the first extension positions the outlet in close proximity to the compressor, and further comprising a first recess defined by a top surface of the resonator, and a first attachment structure positioned in the first recess, the first attachment structure and the first recess defining a first pocket.

2. The system of claim 1, wherein the first extension fits within with the first pocket.

3. The system of claim 2, wherein the first attachment structure defines a first aperture and the first extension defines a first opening, the first aperture and the first opening configured to receive a first fastener.

4. The system of claim 3, wherein the first aperture and the first opening are substantially coaxial when the first extension interfaces with the first pocket.

5. The system of claim 4, further comprising:
    a second extension extending from a back surface of the intake manifold, the second extension defining a second opening and configured to receive a second fastener; and
    a second attachment structure positioned on the top surface of the resonator, the second attachment structure defining a second aperture and configured to receive the second fastener.

6. The system of claim 5, wherein the second opening and the second aperture are substantially coaxial when the resonator is coupled to the intake manifold.

7. A system for reducing noise associated with a compressor of an engine system, comprising:
    an intake manifold comprising a body;
    a plurality of extensions extending from the body;
    a resonator comprising a top surface, the top surface defining a plurality of recesses;
    an outlet pipe in fluid communication with the resonator and the compressor, a length of the outlet pipe extending from the resonator to the compressor;
    wherein the resonator is positioned under the intake manifold and the resonator is in close proximity to the compressor, wherein the top surface of the resonator is in contact with the intake manifold, wherein the plurality of extensions are configured to interface with the plurality of recesses, the plurality of extensions comprising a first extension, a second extension, and a third extension.

8. The system of claim 7, wherein the plurality of recesses comprises a first recess, a second recess, and a third recess.

9. The system of claim 8, further comprising:
    a first attachment structure positioned within the first recess, the first attachment structure and the first recess defining a first pocket, the first extension fitting within the first pocket;
    a second attachment structure positioned within the second recess, the second attachment structure and the second recess defining a second pocket, the second extension fitting within the second pocket; and
    a third attachment structure positioned within the third recess, the third attachment structure and the third recess defining a third pocket, the third extension fitting within the third pocket.

10. The system of claim 9, wherein the first attachment structure defines a first aperture, the second attachment structure defines a second aperture, and the third attachment structure defines a third aperture.

11. The system of claim 10, wherein the first extension defines a first opening, the first aperture and the first opening being substantially coaxial when the first extension is positioned within the first pocket, the second extension defines a second opening, the second aperture and the second opening being substantially coaxial when the second extension is positioned within the second pocket, and the third extension defines a third opening, the third aperture and the third opening are configured being coaxial when the third extension is positioned within the third pocket.

12. The system of claim 7, further comprising:
    a back extension extending from a back surface of the intake manifold, the back extension defining a back opening configured to receive a back fastener; and
    a first attachment structure coupled to the top surface of the resonator, the first attachment structure defining a back aperture, the back aperture configured to receive the back fastener.

13. The system of claim 12, wherein the back opening and the back aperture are substantially coaxial when the resonator is positioned under the intake manifold.

14. An engine system, comprising:
    a compressor;
    a resonator;
    an outlet pipe coupled to the resonator and the compressor, the outlet pipe providing for air flow from the resonator to the compressor, the outlet pipe comprising an outlet pipe length; and
    an intake manifold coupled to, and positioned above, the resonator,
    wherein the position of the resonator relative to the intake manifold causes the resonator to be in close proximity to the compressor, wherein the resonator comprises a top surface, the top surface defining a plurality of recesses, wherein the intake manifold comprises a plurality of extensions, the plurality of extensions configured to interface with the plurality of recesses.

* * * * *